United States Patent [19]

Elexpuru

[11] Patent Number: 4,717,041

[45] Date of Patent: Jan. 5, 1988

[54] PRESSURE COOKER WITH BAYONET CLOSURE AND WEIGHT VALVE

[75] Inventor: Manuel A. Elexpuru, Guipuzcoa, Spain

[73] Assignee: Radar, S. Coop., Escoriaza Guipuzcoa, Spain

[21] Appl. No.: 929,679

[22] Filed: Nov. 10, 1986

[30] Foreign Application Priority Data

Nov. 12, 1985 [ES] Spain .................................. 290269

[51] Int. Cl.⁴ .......................................... B65D 45/00
[52] U.S. Cl. .................................................. 220/316
[58] Field of Search ............. 220/316, 361, 367, 202, 220/203, 209

[56] References Cited

U.S. PATENT DOCUMENTS

| 4,251,007 | 2/1981 | Behnisch | 220/316 |
| 4,423,825 | 1/1984 | Baumgarten | 220/316 |
| 4,512,495 | 4/1985 | Bauer et al. | 220/316 |
| 4,541,543 | 9/1985 | Elexpuru | 220/316 |
| 4,620,643 | 11/1986 | Sebillotte | 220/316 |

Primary Examiner—George T. Hall
Attorney, Agent, or Firm—Abelman Frayne Rezac & Schwab

[57] ABSTRACT

A safety locking mechanism for a pressure cooker includes a member slideable within a handle of the lid of the cooker between a first position in which the handle of the lid and a handle of the cooker body are locked against movement relative to each other, and a second position in which a seal of the cooker is released and a valve of the cooker is moved to an open position to release pressure from within the cooker.

4 Claims, 7 Drawing Figures

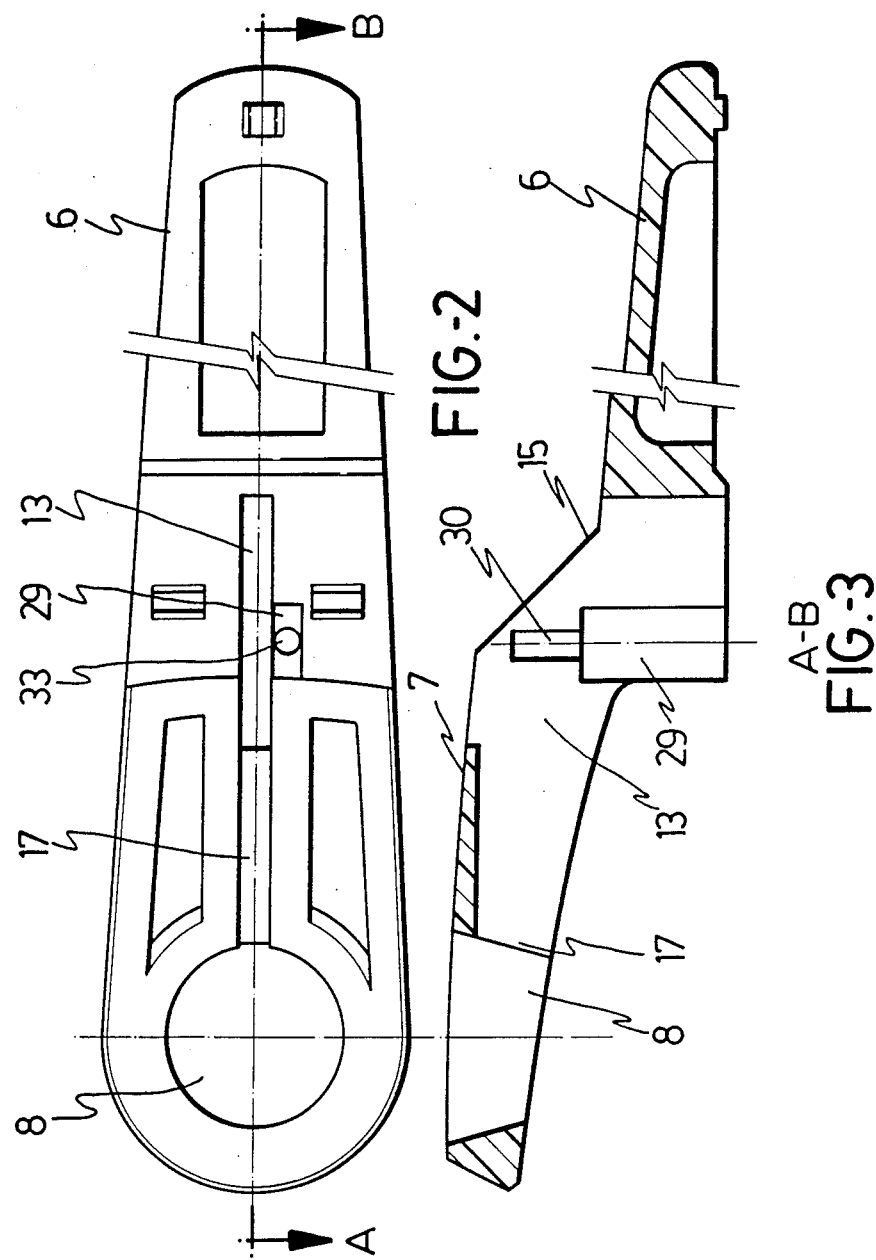

PRESSURE COOKER WITH BAYONET CLOSURE AND WEIGHT VALVE

The present invention, in accordance with the title of the specification, relates to a pressure cooker which, having a bayonet system as a means for coupling the body and lid, nevertheless includes a weight valve as the element for regulating the cooking pressure.

As is known, there are two basic groups in the field of pressure cookers, one in which the lid is coupled to the cooker with the aid of a bridge, and another in which said elements are coupled by means of a bayonet system. In the former case, a weight valve placed on the lid may be used as the control element, for the actual closure system of the cooker prevents same from opening as a result of an excess of pressure inside the cooker, and consequently also avoids risks to the user, whereas cookers having bayonet-type closures make use of spring valves of a more complex structure and, therefore, of a greater cost, but which, through suitable mechanisms, ensure that pressure is released as a result of turning the lid with respect to the body on opening the cooker before the lid and body are completely uncoupled, thereby ensuring the absence of handling risks on opening, even if aperture is effected with a considerable amount of pressure still within the cooker.

Bayonet-type closure systems are obviously more convenient for the user, and it is therefore desirable that cookers having this type of closure system are provided with a weight valve in order to simplify the structure thereof and consequently decrease their cost, whilst maintaining maximum guarantees as regards safety.

The above coincides exactly with the aim of the pressure cooker of the invention, which has been specially designed and structured to include a weight valve in addition to a bayonet-type closure system between body and lid, and to guarantee that aperture thereof even under conditions of maximum internal pressure is effected at no risk whatsoever to the user.

More specifically, and in order to achieve the above, the characteristics of the cooker being described are centred on the provision, on the handle carried by the lid, of a mobile element capable of longitudinal displacement along said handle, said element being provided with means for engaging/disengaging the handle carried by the body of the cooker, together with an arm which, when suitably guided along the upper handle, near the area of adaption thereof to the lid of the cooker, affects the weight valve, raising same and causing it to open, the flange being parallel to said arm simultaneously affecting the seating gasket between the body and lid, deforming same and establishing a further outlet for the pressurised fluid.

The arm and flange of the said mobile element are ineffective when the cooker is in operation, in which case said element is in a position furthest from the axis of the cooker, and, furthermore, acts as a coupling joint between the two handles of the cooker, preventing the aperture thereof.

In order to open the cooker, the said mobile element must be displaced towards the axis of the cooker, in order that the lower end of said element reaches a side branch of the depression provided in the lower handle and in which said element moves, thus allowing aperture; the upper arm of said element simultaneously affects the valve upon displacement, resulting in aperture thereof, and the lower flange affects the sealing gasket, deforming same.

In a more specific manner, three stable positions have been foreseen for the said mobile element, which positions are clearly defined with the aid of a metal band, one of said positions corresponding to operation mode, where both the arm and the flange are ineffective, an intermediate position corresponding to "decompression", where the mobile element still maintains the two handles locked together, where the lower flange does not yet deform the sealing gasket between body and lid, and where the upper arm causes the partial opening of the weight valve, and a third stable position, being the end position opposite that of operation, which corresponds to the postion of aperture, where the sealing gasket is deformed, the weight valve is fully opened, and the two handles are uncoupled, thereby allowing the lid to turn relative to the rest of the body, in order to effect aperture of the cooker.

In addition to the structure described, and as a complement thereto, a cavity is provided for housing an eccentric on the upper arm and laterally with respect to the housing of the said mobile element, which eccentric tends to permanently project toward the lower handle due to the action of a spring, and which is provided with a rib on the surface to be adapted to the mobile element, said rib sliding in an "L"-shaped channelling operatively made in the corresponding surface of the mobile element, such that when the mentioned handles are situated one over the other, the rib slides in the horizontal branch of the channelling allowing free displacement of the mobile element, and, alternatively, when said mobile element is in the position of aperture, the rib faces the vertical branch of the channelling and the eccentric rests on a part of the lower handle laterally whereto is defined a sloping plane, as a result of which the eccentric moves down said sloping plane due to the action of the spring related thereto when the upper handle turns in the direction of aperture, and the rib slides towards the bottom of the vertical branch of the channelling, said eccentric being thus locked in place with respect to the mobile element when the two handles are separated, on opening the cooker, and likewise locking the mobile element with respect to the upper handle so that the said element is forced to remain in the previously-mentioned position of aperture until the cooker is again closed and the eccentric moves up along the sloping plane of the lower handle, thereby releasing the mobile element. This ensures that when the lid is uncoupled, the mobile element which acts as a control knob remains at all times in the position of aperture, thereby preventing closure of the cooker in an unsuitable position in which said mobile element could be damaged or rendered unserviceable.

In order to complete the description being made, and to assist the better understanding of the characteristics of the invention, a set of drawings is attached to the present specification, as an integral part thereof, in which the following has been shown in an illustrative and non-limiting manner:

FIG. 2 shows a lower plan view of the upper handle of the cooker, i.e., the handle fastened to the lid.

FIG. 3 shows a side elevation view and longitudinal section of the handle of the preceding figure.

Figure 1:
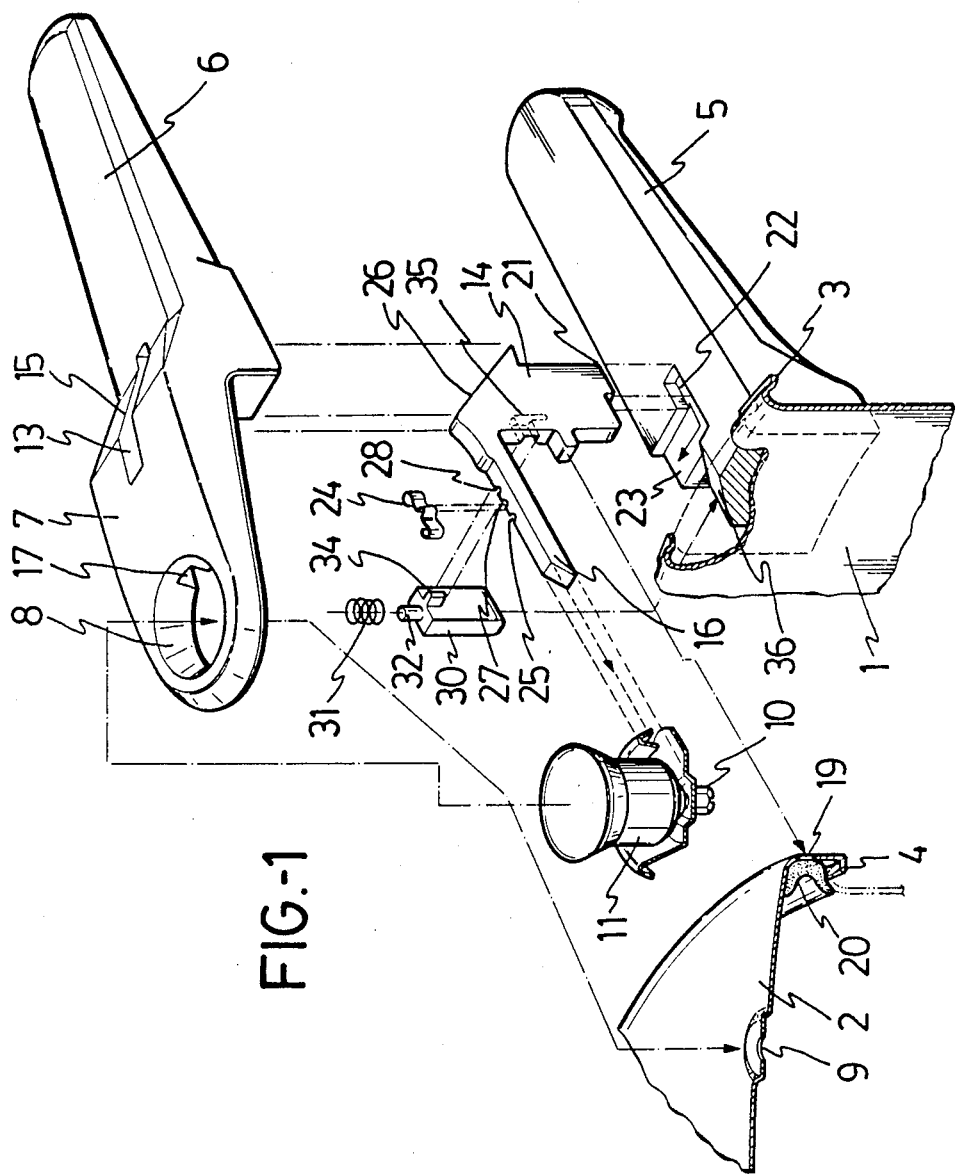
FIG. 1 shows a perspective piece-by-piece view of the two handles of a pressure cooker with a bayonet-closure system and weight valve in accordance with the object of the present invention, and likewise showing said weight valve and the areas of body and lid to which these elements are related, together with the elements taking part in aperture and closure thereof.
Figure 4:
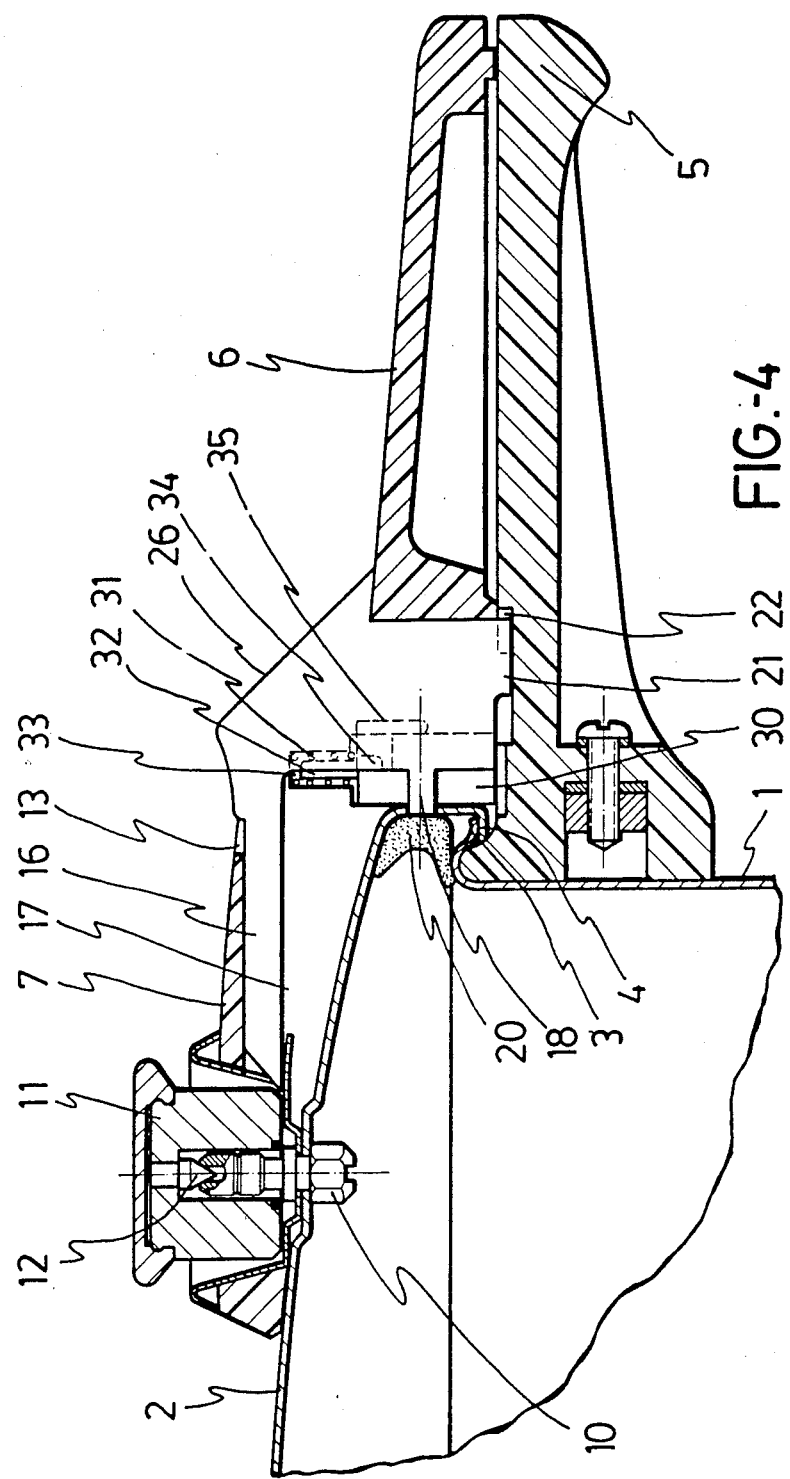
FIG. 4 shows an assembly of FIG. 1, in side elevation and sectional view, corresponding to the position of use or operation of the cooker.
Figure 5:
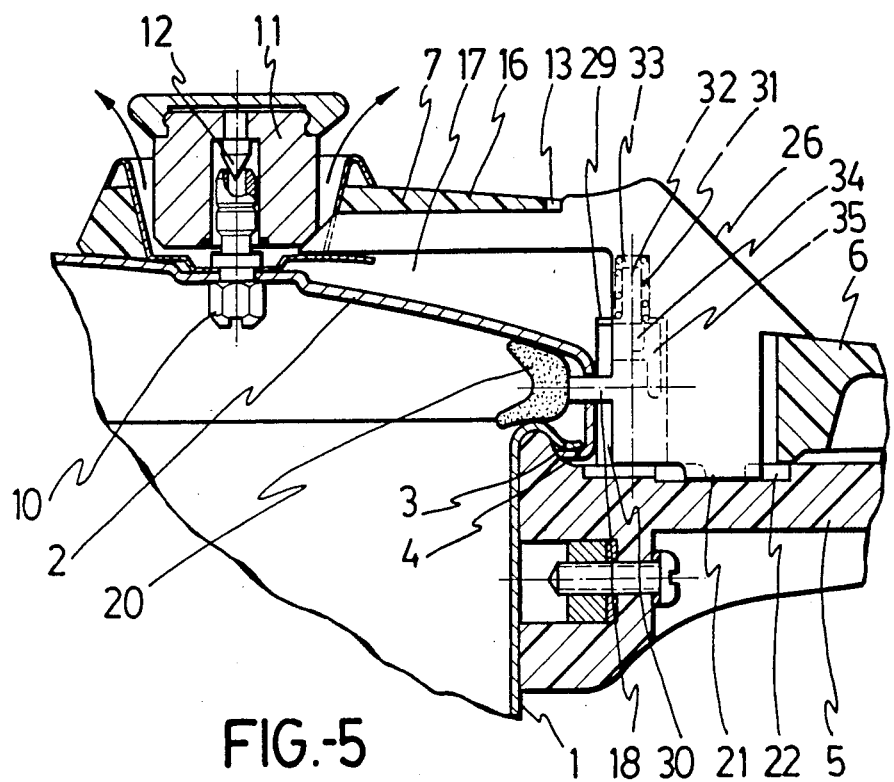
FIG. 5 shows a similar view of the assembly of the preceding figure, in the position corresponding to decompression.
Figure 6:
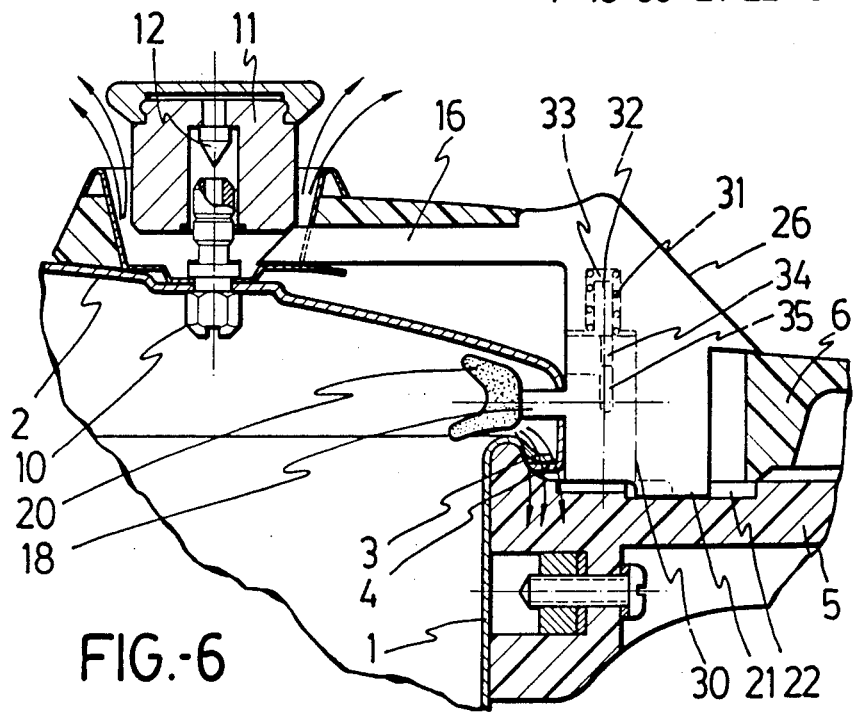
FIG. 6 shows the assembly of the two preceding figures in the position of aperture.

In the light of these figures, and specifically of FIG. 1, it can be seen how a pressure cooker in accordance with the object of the present invention includes a body 1 and a lid 2 which are provided with respective complementary overhangs 3 and 4 along the rims thereof for establishing the bayonet closure, the handle 5 being related radially to the body 1, and handle 6 to the lid 2, handle 6 having a sector 7 which substantially overrides the lid, as shown in FIGS. 4 to 6, and which includes an aperture 8 designed to fit over the aperture 9 of lid 2 on which is fitted the valve seat 10 which carried the weight valve 11 on the conical support or plug 12.

In addition to this basic structure, there is provided on the upper handle 6 a flat, longitudinal housing 13 in which slides a mobile element 14 which projects upwards in a central position from the upper surface of handle 6 through a window 15 operatively made therein and shown clearly in FIG. 1, such that the section of said element 14 which projects upwards acts as the control knob of the said element.

The mobile element 14 includes an arm 16 on its upper section capable of being manually and longitudinally displaced together with the mobile element 14, along a guide 17 likewise provided in the upper handle 6 and opening towards aperture 8, as shown likewise in FIG. 1, the free end of arm 16 being designed to affect the weight valve 11 causing aperture thereof at certain positions of element 14 which shall hereinafter be described.

The mobile element 14 further includes a flange 18 which, in another position of the mobile element 14, crosses the perimetral overhand of lid 2 through aperture 19, operatively made therefor, and affects the sealing gasket 20 provided between the lid and body, causing deformation thereof, in order to release the pressure inside the cooker.

Mobile element 14 finally has a lower extension 21, designed to fit into a longitudinal depression 22 of the lower handle 5, which depression 22 extends sideways 23 at its front end to allow lateral displacement of the mobile element 14 with respect to said depression.

Thus, and in accordance with the structure described, in the position of operation of the cooker the mobile element 14 adopts the extreme position furthest from the body/lid assembly of the cooker, shown at FIG. 4, this being a stable position due to the existence of a metal band 24 which laterally attacks arm 16 of moving element 14 and which, in said position, fits into a notch 25 provided in said arm position wherein the extension 21 of the moving element 14 is housed at the bottom of depression 22, acting as a locking element between the two handles 5 and 6, and consequently preventing aperture of the cooker.

In order to open the cooker, the knob 26 constituted by the projecting section of the mobile element 14 must be actuated through the window or aperture 15 and placed in a second stable position in which the metal band 24 fits into a second notch 27 of arm 16 of the mobile element, and in which, as shown in FIG. 5, the free end of arm 16 affects the base of weight 11, slightly raising same, thus uncoupling the valve plug 12 of the corresponding valve seat 10 and resulting in release of pressure as per the arrows shown in the mentioned FIG. 5.

Further actuation of the knob 26 displaces the mobile element 14 into a third stable position where the metal band 24 fits into notch 28, in which position, as shown in figure 6, weight 11 is raised further, thus resulting in a greater valve aperture, the end of arm 16 being fully established under said weight, flange 8 simultaneously affecting the sealing gasket 20, deforming same and producing a secondary, complementary outlet of fluid, all the pressure inside the cooker being thus released.

In the previous position of the mobile element 14, i.e., in the position of decompression, the lower extension thereof is still housed within depression 22 of the lower handle 5, wherefore aperture of the valve is impossible, whereas in this third and last position the extension 21 faces the outlet branch 23 of the said depression and the upper handle 6 may thus be laterally displaced relative to the lower handle 5, allowing aperture of the cooker.

In order to avoid actuation of the knob 26 or of the mobile element 14 when the lid is separated from the body, and to ensure, therefore, that the lower extension 21 of said element at all times faces the side branch 23 of depression 22 when closure of the cooker is to be effected, a further cavity or housing 29 is provided on the upper handle 6, to one side of housing 13, for an eccentric 30 which can be vertically displaced by means of a spring 31, wherefore said eccentric has a small cylindrical neck 32 over which the said spring is coaxially fitted, and which, in turn, fits into a cylindrical recess 33 provided at the bottom of housing 29, said eccentric 30 having a side rib 34 designed to slide in a channelling 35 made in the corresponding surface of the mobile element 14, which channelling 35, as shown in FIG. 1, is of an L-shaped configuration, having a horizontal branch opening towards the front edge of said element 14, and a blind, descending vertical branch.

Figure 7:
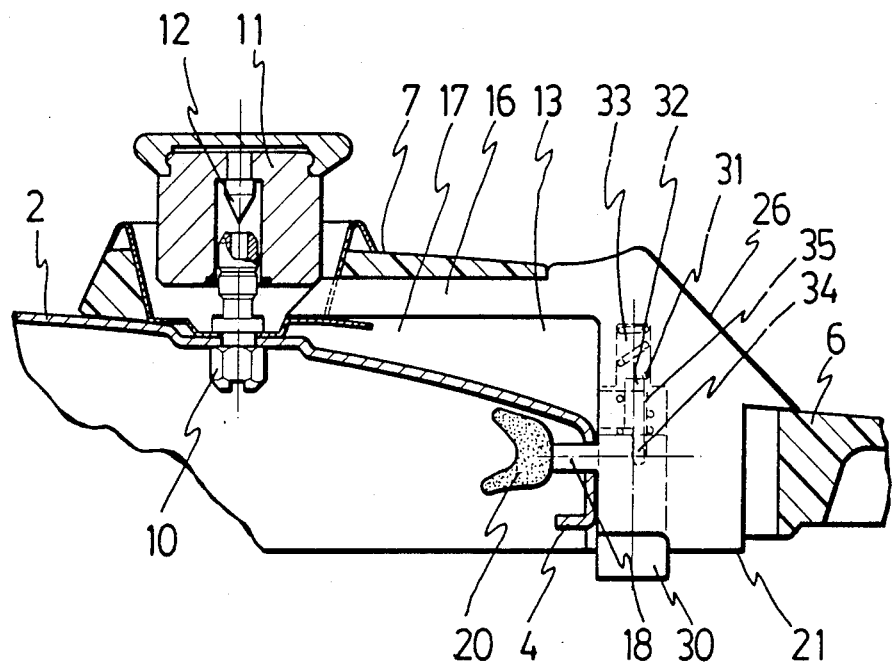
FIG. 7 shows the arrangement of the elements related to the lid upon separation of the latter from the body of the cooker.

In correspondence with eccentric 30, a laterally sloping plane 36 is provided on the lower handle, due to which the said eccentric 30 adopts its position of maximum height when the two handles are placed simultaneously one over the other, i.e., when the cooker is closed, wherefore the mobile element 14 can move freely into any one of its three positions, for the rib 34 will then be housed in the horizontal branch of channelling 35, whereas when the lid and body are uncoupled, as shown in FIG. 7, and the eccentric 30 moves downwards due to the action of spring 31 on being displaced along the sloping plane 36, and the rib 34 slides vertically within the likewise vertical branch of channelling 35 until it reaches the end thereof, at which time the eccentric 30 is locked in a descending position, thus keeping the upper handle together, and, at the same time, said eccentric locks the mobile element into place by means of rib 34, holding same in the position corresponding to aperture of the cooker, this position remaining unaltered until the body and lid are again coupled together, at the end of which coupling, and due to the displacement of eccentric 30 on the sloping plane 36, said eccentric moves upwards until the rib 34 thereof reaches the horizontal branch of channelling 35, and element 14 may again be displaced.

Thus, as a result of the structure described, there is obtained a pressure cooker having a bayonet-type closure system and fitted with a weight valve, offering maximum guarantees of safety due to the fact that aperture thereof cannot be effected prior to decompression, means being furthermore provided to prevent a change in the position of the elements which effect such decompression when the cooker is open, thereby ensuring the correct positioning of such element on closing the cooker.

Lastly, it should here be pointed out that although the present description contains three operative positions for the mobile element 14, namely, a working or operational position, a position of decompression, and a position of aperture, arm 16 carrying the necessary notches, in order to obtain a progressively larger thrust on the weight 11 of the valve system, it is nevertheless possible for the cooker to include only two positions, a working position and a position of aperture/decompression, in which case the free end of arm 16 acts brusquely rather than progressively on the weight of the valve mechanism in the position of aperture, and he end thereof need not be bevelled as before.

It is not considered necessary to extend the present description for a person skilled in the art to understand the scope thereof and the advantages derived therefrom.

The materials, shape, size and arrangement of the elements may vary, provided such variation does not imply a modification to the essentiality of the invention.

The terms used in the description of the specification must be taken to have a broad and non-limited meaning.

I claim:

1. Pressure cooker with bayonet closure and weight valve, of the type including a pair of handles related to body and lid, respectively, which in the closed position are arranged one over the other and adopt a radial disposition with respect to the arms of the cooker, essentially characterised in that a housing is established in the upper handle for a mobile element which projects partially outwards from said handle through a window operatively made in said handle, such that the projecting sector of said element constitutes a knob for manual actuation thereof, it having been foreseen that said mobile element includes an arm which, when suitably guided along a track provided within the upper handle, in the sector thereof which overrides the lid, reaches the area of the weight valve, affecting same and causing aperture thereof in a certain position of the knob, said mobile element further including a lower flange which crosses an aperture operatively made in the perimentral overhang of the lid and affects the sealing gasket between body and lid, thus establishing another point for pressure release, it having been further foreseen that the mobile element includes a lower extension which fits into a depression provided in the lower handle, said depression having a side opening so that said element may likewise act as a locking element for the two handles, in a certain position thereof, but allowing said handles to unlock in a different position where the said extension operatively faces the side outlet of the depression.

2. Pressure cooker with bayonet closure and weight valve, in accordance with claim 1, characterised in that three positions are established along the depression of the lower handle for the said mobile element located in the upper handle, which positions are rendered stable with the aid of a metal band suitably placed in the upper handle and three notches provided in one of the side surfaces of the arm of the mobile element, such that in a stable position of said element corresponding to the maximum distance thereof from the axis of the cooker, the arm and flange of said element are ineffective and the lower extension is located in the depression of the lower handle; in an intermediate position the flange remains ineffective, the lower extension remains within the depression of the lower handle, and the free end of the arm affects the weight valve, causing partial aperture thereof, this being the position of decompression; and in the extreme position of said mobile element, that of greatest proximity to the axis of the cooker, the upper arm causes maximum aperture of the weight of the valve system, the flange deforms the sealing gasket, and the lower extension of said mobile element faces the side opening of the depression, thereby allowing the lid to turn for uncoupling thereof.

3. Pressure cooker with bayonet closure and weight valve, in accordance with claim 1, characterised in that a second housing is provided on the upper handle, next to the housing for the mobile element, for an eccentric which can be displaced vertically in a downward direction due to the action of a spring, said eccentric having a rib on the face thereof to be adapted to the mobile element, which fits into an L-shaped channelling operatively made in said mobile element, such that in the closed position of the lid said rib is situated on the horizontal branch of the channelling made in the said mobile element, thereby allowing displacement thereof to any one of its three positions, whereas in the position of aperture said rib faces the vertical branch, with the particularity that on rotation of the lid to the opening position the eccentric is displaced over a sloping plane defined in the lower handle and descents progressively together with the rib thereof which descends within the vertical branch of the L-shaped channelling of the mobile element, up to an extreme position where the rib abuts the bottom of said vertical branch of the channelling, the mobile element being therefore unable to move from its position of aperture to either of the two remaining positions corresponding to decompression and operation.

4. Pressure cooker with bayonet closure and weight valve, in accordance with claim 2, characterised in that a second housing is provided on the upper handle, next to the housing for the mobile element, for an eccentric which can be displaced vertically in a downward direction due to the action of a spring, said eccentric having a rib on the face thereof to be adapted to the mobile element, which fits into an L-shaped channelling operatively made in said mobile element, such that in the closed position of the lid said rib is situated on the horizontal branch of the channelling made in the said mobile element, thereby allowing displacement thereof to any one of its three positions, whereas in the position of aperture said rib faces the vertical branch, with the particularity that on rotation of the lid to the opening position the eccentric is displaced over a sloping plane defined in the lower handle and descends progressively together with the rib thereof which descends within the vertical branch of the L-shaped chanelling of the mobile element, up to an extreme position where the rib abuts the bottom of said vertical branch of the channelling, the mobile element being therefore unable to move from its position of aperture to either of the two remaining positions corresponding to decompression and operation.

* * * * *